US 12,376,575 B2

(12) United States Patent
Barja, Jr.

(10) Patent No.: US 12,376,575 B2
(45) Date of Patent: Aug. 5, 2025

(54) FISHING CADDY

(71) Applicant: John Barja, Jr., Mint Hill, NC (US)

(72) Inventor: John Barja, Jr., Mint Hill, NC (US)

(73) Assignee: UNIFIFTH, L.L.C., Mint Hill, NC (US)

( * ) Notice: Subject to any disclaimer, the term of this patent is extended or adjusted under 35 U.S.C. 154(b) by 69 days.

(21) Appl. No.: 18/111,364

(22) Filed: Feb. 17, 2023

(65) Prior Publication Data

US 2024/0276963 A1    Aug. 22, 2024

(51) Int. Cl.
| | |
|---|---|
| A01K 97/04 | (2006.01) |
| A01K 97/05 | (2006.01) |
| A01K 97/06 | (2006.01) |
| A01K 97/08 | (2006.01) |

(52) U.S. Cl.
CPC .............. *A01K 97/05* (2013.01); *A01K 97/04* (2013.01); *A01K 97/06* (2013.01); *A01K 97/08* (2013.01)

(58) Field of Classification Search
CPC ........ A01K 97/04; A01K 97/05; A01K 96/06; A01K 97/08; A01K 97/20; A01K 97/02; A01K 97/00; A01K 99/00; A01K 61/60; A01K 63/02; A47G 2200/02
USPC ........................ 43/54.1, 55, 56, 26, 44.99, 4; 206/315.11; 224/920, 922; 220/560; 119/201, 203, 223
See application file for complete search history.

(56) References Cited

U.S. PATENT DOCUMENTS

| | | | | |
|---|---|---|---|---|
| 268,558 | A * | 12/1882 | Small .................... | A01K 97/04 43/55 |
| 292,123 | A * | 1/1884 | Lindsay ................ | A01K 97/04 43/55 |
| 307,375 | A * | 10/1884 | Busche .................. | A01K 97/05 43/56 |
| 1,444,367 | A * | 2/1923 | Brolliar ................ | A01K 63/003 43/56 |
| 2,030,793 | A * | 2/1936 | Horn ...................... | A01K 97/20 43/55 |
| 2,169,941 | A * | 8/1939 | Campbell .............. | A01K 97/05 43/56 |
| 2,203,565 | A * | 6/1940 | Field ...................... | B63B 35/26 114/343 |

(Continued)

FOREIGN PATENT DOCUMENTS

| | | | | |
|---|---|---|---|---|
| CA | 1301454 | C * | 5/1992 | ............ A01K 61/60 |
| CN | 1468514 | A * | 1/2004 | |

(Continued)

*Primary Examiner* — Darren W Ark
(74) *Attorney, Agent, or Firm* — Timothy R. Kroboth (57) ABSTRACT

The present invention is directed to a buoyant fishing caddy that includes an outer housing that includes a wall part detachable from the outer housing, and a bait net storage compartment that includes the detachable wall part.

A preferred embodiment of the fishing caddy is generally rectangular and includes a buoyant upper compartment and a lower compartment. The lower compartment benefits use of the fishing caddy as carry-on luggage that can hold, for example, a telescoping or multipiece fishing rod when traveling to a fishing destination, and furthermore benefits use when fishing.

In another preferred embodiment, the bait net storage compartment is generally cylindrical and is encircled by a ring that includes generally arcuate side compartments.

12 Claims, 4 Drawing Sheets

(56) References Cited

U.S. PATENT DOCUMENTS

| | | | | |
|---|---|---|---|---|
| 2,241,314 A * | 5/1941 | Mohler | A01K 97/20 | 383/117 |
| 2,341,246 A * | 2/1944 | Stowe | A01K 97/05 | 43/56 |
| 2,493,203 A * | 1/1950 | Madeksho | A01K 97/20 | 43/55 |
| 2,560,054 A * | 7/1951 | Wells | A01K 97/20 | 441/32 |
| 2,564,513 A * | 8/1951 | Terwilliger | A01K 97/20 | 43/55 |
| 2,603,028 A * | 7/1952 | Roberts | A01K 97/20 | 297/188.09 |
| 2,657,496 A * | 11/1953 | Robert | A01K 97/05 | 43/55 |
| 2,739,410 A * | 3/1956 | Budnick | B65D 1/32 | 383/3 |
| 2,811,276 A * | 10/1957 | Ray | A01K 97/06 | 441/32 |
| 2,823,971 A * | 2/1958 | Hoyt | A01K 97/06 | 312/290 |
| 2,854,782 A * | 10/1958 | Daugherty | A01K 97/05 | 43/55 |
| 2,984,208 A * | 5/1961 | Kopietz | A01K 61/80 | 43/44.99 |
| 2,997,160 A * | 8/1961 | Marshall, Jr. | A01C 21/00 | 43/44.99 |
| 3,025,629 A * | 3/1962 | Sears | A01K 97/05 | 220/232 |
| 3,156,063 A * | 11/1964 | Mace | A01K 77/00 | 43/11 |
| 3,182,340 A * | 5/1965 | Gentile | B63C 9/02 | 441/32 |
| 3,304,645 A * | 2/1967 | Hardesty | A01K 97/05 | 43/55 |
| 3,367,061 A * | 2/1968 | Primmer | A01K 63/02 | 43/55 |
| 3,402,506 A * | 9/1968 | Renfro | C12M 23/48 | 119/223 |
| 3,478,463 A * | 11/1969 | Ruter | A01K 97/20 | 43/55 |
| 3,524,278 A * | 8/1970 | Wolfe | A01K 97/20 | 43/55 |
| 3,678,611 A * | 7/1972 | Files | A01K 97/06 | 224/616 |
| 3,717,124 A * | 2/1973 | Jacobs | A01K 61/60 | 43/56 |
| 3,919,803 A * | 11/1975 | Manguso | A01K 97/20 | 43/55 |
| 3,958,359 A * | 5/1976 | Doughty | A01K 97/22 | 43/55 |
| 3,988,853 A * | 11/1976 | Hudkins | A01K 97/20 | 43/55 |
| 4,003,338 A * | 1/1977 | Neff | A01K 63/00 | 119/223 |
| 4,013,042 A * | 3/1977 | Ingold | A01K 61/60 | 119/223 |
| 4,231,873 A * | 11/1980 | Swigger | E02B 1/00 | 210/205 |
| 4,297,804 A * | 11/1981 | Weld | A01K 97/05 | 43/56 |
| 4,570,374 A * | 2/1986 | Baxley | A01K 97/20 | 43/55 |
| 4,589,546 A * | 5/1986 | Sunderland | A01K 97/06 | 220/252 |
| 4,638,593 A * | 1/1987 | Garcia | A01K 97/05 | 43/56 |
| 4,671,008 A * | 6/1987 | Lindemood | A01K 97/05 | 43/56 |
| 4,703,577 A * | 11/1987 | Gubash | A01K 63/00 | 43/7 |
| 4,794,723 A * | 1/1989 | Arnold | A01K 97/04 | 43/56 |
| 4,858,372 A * | 8/1989 | Ray | A01K 97/20 | 43/17.5 |
| 4,870,778 A * | 10/1989 | Sheppard | A01K 97/05 | 43/56 |
| 4,871,079 A * | 10/1989 | Doucette | A45C 11/20 | 220/560 |
| 4,878,311 A * | 11/1989 | Cano | A01K 97/06 | 43/55 |
| 4,887,716 A * | 12/1989 | Abraham | A47K 3/004 | 206/139 |
| 4,890,413 A * | 1/1990 | Nelson | A01K 97/20 | D22/136 |
| 4,903,429 A * | 2/1990 | Tetenes | A01K 97/02 | 43/44.99 |
| 4,905,404 A * | 3/1990 | Pasion | A01K 97/20 | 43/56 |
| 4,927,041 A * | 5/1990 | Hepburn | A01K 97/04 | 220/592.25 |
| 4,996,790 A * | 3/1991 | Ruggles | A01K 97/05 | 43/55 |
| 4,999,943 A * | 3/1991 | Crabtree | A01K 97/06 | 43/57.1 |
| D323,698 S * | 2/1992 | Nelson | D22/136 | |
| 5,117,577 A * | 6/1992 | Burghoff | A01K 97/02 | 43/44.99 |
| 5,163,694 A * | 11/1992 | Reichek | A01K 97/06 | 280/79.2 |
| D336,508 S * | 6/1993 | Mathews | D22/135 | |
| 5,235,774 A * | 8/1993 | Burghoff | A01K 75/02 | 43/44.99 |
| 5,251,113 A * | 10/1993 | Wagoner | B63B 22/166 | 441/35 |
| 5,261,561 A * | 11/1993 | Hodges, Jr. | B25H 3/06 | 206/315.11 |
| 5,305,544 A * | 4/1994 | Testa, Jr. | A01K 97/05 | 206/315.11 |
| 5,402,596 A * | 4/1995 | Gillming, Jr. | A01K 97/06 | 206/315.11 |
| 5,419,073 A * | 5/1995 | Kline, Sr. | A01K 97/01 | 43/4 |
| 5,471,779 A * | 12/1995 | Downey | A01K 97/22 | 206/315.11 |
| 5,547,098 A * | 8/1996 | Jordan | B25H 3/06 | 220/528 |
| 5,551,186 A * | 9/1996 | Harada | A01K 97/20 | 224/920 |
| D375,781 S * | 11/1996 | Caldwell | D22/134 | |
| 5,634,291 A * | 6/1997 | Pham | A01K 97/05 | 43/56 |
| 5,636,469 A * | 6/1997 | Pizzolo | A01K 97/05 | 206/315.11 |
| 5,967,086 A * | 10/1999 | Knott, Sr. | A01K 61/60 | 119/223 |
| 6,014,833 A * | 1/2000 | Benavidez | A01K 97/06 | 206/315.11 |
| 6,269,587 B1 * | 8/2001 | Wallace | A01K 97/20 | 206/315.11 |
| 6,386,146 B1 * | 5/2002 | Knott, Sr. | A01K 61/60 | 119/223 |
| D485,329 S * | 1/2004 | Haws | D22/136 | |
| 7,219,465 B2 * | 5/2007 | Beech | A01K 97/05 | 43/55 |
| 7,222,743 B1 * | 5/2007 | Wilhelm | A01K 97/06 | 220/560 |
| 7,225,583 B1 * | 6/2007 | Stacy | A01K 97/02 | 43/44.99 |
| 7,249,435 B1 * | 7/2007 | Tetenes | A01K 97/20 | 43/44.99 |
| 7,464,498 B2 * | 12/2008 | Lester | A01K 97/20 | 43/56 |
| 7,788,843 B2 * | 9/2010 | Boos, Jr. | A01K 97/20 | 43/56 |
| 8,756,856 B1 * | 6/2014 | Girvin | A01K 97/20 | 220/560 |
| 8,794,475 B1 * | 8/2014 | Daniels | A01K 77/00 | 220/560 |

(56) References Cited

U.S. PATENT DOCUMENTS

| | | | | |
|---|---|---|---|---|
| 8,915,010 | B1* | 12/2014 | Gardner | A01K 97/06 220/560 |
| 10,568,312 | B2* | 2/2020 | McPherson | B65D 81/3216 |
| 10,624,328 | B1* | 4/2020 | Avery | A01K 63/02 |
| 2002/0017049 | A1* | 2/2002 | Millett | A01K 97/20 43/11 |
| 2004/0231226 | A1* | 11/2004 | Yust | A01K 63/02 43/55 |
| 2005/0055869 | A1* | 3/2005 | Corso | A01K 97/06 43/54.1 |
| 2005/0279013 | A1* | 12/2005 | Iwaniec | A01K 97/06 43/55 |
| 2008/0110079 | A1* | 5/2008 | Jeffries | A01K 97/06 43/55 |
| 2010/0050908 | A1* | 3/2010 | Moore, Jr. | A01K 97/22 108/33 |
| 2011/0119986 | A1* | 5/2011 | Sellers | A01K 97/04 206/315.11 |
| 2011/0197494 | A1* | 8/2011 | Schumacher | A01K 97/06 43/54.1 |
| 2012/0110890 | A1* | 5/2012 | Garrett | A01K 97/20 43/7 |
| 2014/0360089 | A1* | 12/2014 | Weatherton | A01K 97/05 43/55 |
| 2014/0360090 | A1* | 12/2014 | Nickolas | A01K 97/05 29/428 |
| 2016/0212983 | A1* | 7/2016 | Boudreau | A01K 97/04 |
| 2021/0195880 | A1* | 7/2021 | Dominguez | A01K 97/02 |
| 2022/0408951 | A1* | 12/2022 | Rietema | B63B 21/20 |
| 2023/0070360 | A1* | 3/2023 | Soderquist | A01K 97/20 |
| 2024/0032523 | A1* | 2/2024 | Karns | A01K 97/05 |
| 2024/0349715 | A1* | 10/2024 | Hessler | A01M 31/008 |

FOREIGN PATENT DOCUMENTS

| | | | | |
|---|---|---|---|---|
| CN | 205813330 U | * | 12/2016 | |
| CN | 209171238 U | * | 7/2019 | |
| CN | 209359408 U | * | 9/2019 | |
| CN | 210226625 U | * | 4/2020 | |
| GB | 1515253 A | * | 6/1978 | A01K 61/007 |
| GB | 2309632 A | * | 8/1997 | A01K 97/05 |
| JP | 2020039325 A | * | 3/2020 | |
| KR | 101315253 B1 | * | 10/2013 | |
| KR | 100740545 B1 | * | 4/2018 | |
| KR | 20180043545 A | * | 4/2018 | |
| KR | 101880814 B1 | * | 8/2018 | |

\* cited by examiner

FISHING CADDY

FIELD OF THE INVENTION

The present invention relates to a buoyant fishing caddy advantageously for use by a fisherman standing, or immersed fully or partially, in water.

BACKGROUND OF THE INVENTION

Buoyant or floating fishing caddies that include a mesh net or live bait compartment are known and are exemplified by U.S. Pat. No. 4,638,593 to Garcia, U.S. Pat. No. 4,671,008 to Lindemood, U.S. Pat. No. 4,794,723 to Arnold et al, U.S. Pat. No. 6,014,833 to Benavidez, U.S. Pat. No. 6,269,587 to Wallace, U.S. Pat. No. 8,756,856 to Girvin, and published U.S. Patent Application No. 2014036090 to Nickolas. This type of fishing caddy can vary in shape from generally rectangular, as illustrated by the Lindewood, Wallace and Nickolas patents, to generally circular, as illustrated by the Arnold et al and Girvin patents.

As described by the Girvin patent, a floating caddy having a generally circular shape, may include a flotation ring, and a generally centrally located, vertical passageway through which a mesh net may extend. Also known is a generally cylindrical, buoyant fishing accessory useful for carrying and transporting a fishing rod within. This type of fishing accessory is illustrated by U.S. Pat. No. 3,678,611 to Files.

Despite the advantages provided by prior art buoyant fishing caddies, an improved buoyant fishing caddy that includes a live bait net is needed to advance the fishing experience when standing, or immersed fully or partially, in water. It would especially be advantageous for the caddy to be useful as carry-on luggage for traveling to a fishing destination, as well as for fishing.

SUMMARY OF THE INVENTION

The inventive fishing caddy is buoyant and useful for a variety of fishing adventures including snorkel fishing and fishing while wading, and advantageously may have dimensions suitable to be transported and stowed as carry-on luggage for air travel. Although buoyant, the inventive caddy is intended to be partially immersed. For flotation stability, the caddy is constructed to be balanced when partially immersed.

In its essential aspects, a buoyant fishing caddy in accordance with the present invention, is based in part on an outer housing that includes a wall part detachable from the housing, and within the housing, a bait net storage compartment that includes the detachable wall part. Furthermore, a bottom of a bait net is advantageously attached to the detachable wall part, and a bottom wall of the housing includes the detachable wall part.

For carrying and transporting the fishing caddy, the bait net is stowed within the bait storage net compartment, and the detachable wall part of the bait net storage compartment is attached to the housing.

For fishing, that is, in a bait net-deployed configuration, the detachable wall part is detached from the housing and the bait net is deployed. In the deployed configuration, the bottom of the deployed bait net extends below the fishing caddy, and the detachable wall part benefits configurational stability of the deployed bait net.

In additional beneficial aspects, the fishing caddy further includes within the housing and exterior to the bait net storage compartment, an upper compartment that provides buoyancy. The upper compartment is above an interior space of the housing, and is advantageously sealed.

The interior space may be within a lower compartment. A generally horizontal partition defines the lower boundary of the upper compartment and the upper boundary of the interior space. The interior space may advantageously be in fluid communication with the bait net storage compartment, and the detachable wall part of the bait net storage compartment may beneficially control access to the bait net storage compartment and to the interior space.

The lower compartment may in addition be provided with a closure member for controlling access. For fishing, an opened lower compartment allows entry of water into the interior space, as a result of which the caddy will float relatively lower in the water, which benefits flotation balance of the caddy.

Advantageously, an end wall of the bait net storage compartment may include a hinged wall part. Beneficially, for fishing, the hinged wall part of the bait net storage compartment is released from a closed position, and a scoop net holder is deployed. In the closed position, the scoop net holder is kept within the bait net storage compartment.

Furthermore, the bait net storage compartment may beneficially include an access lid, an end of which overlaps a projecting upper end of the hinged wall part in the closed position, to keep the scoop net holder within the bait net storage compartment. The hinged wall part is advantageously released for deployment of the scoop net holder by opening the access lid of the bait storage compartment.

In a preferred embodiment of an inventive fishing caddy, the outer housing is generally rectangularly shaped, and in addition to a generally planar bottom wall, the housing includes opposing end walls and opposing side walls. In this embodiment, each of the side walls of the outer housing is spaced apart from a generally parallel, vertical partition, and the generally parallel side walls and vertical partitions cooperate to define interior side compartments of the fishing caddy. Each interior side compartment includes an upper compartment that provides buoyancy, and that is above an interior space of the side compartment.

As previously described, each interior space may be within a lower compartment that may be provided with a closure member for controlling lower compartment access. This feature of a lower compartment of this preferred embodiment, benefits use of the fishing caddy as carry-on luggage that can hold within the lower compartments, for example, a telescoping or multipiece fishing rod when traveling to a fishing destination, and furthermore benefits, as previously described, use when fishing.

In another preferred embodiment of an inventive fishing caddy, the bait net storage compartment is generally cylindrical, and the outer housing includes a generally circular wall that is spaced apart from, and cooperates with, a generally circular peripheral wall of the bait net storage compartment to form a ring that encircles the bait net storage compartment. The encircling ring includes generally arcuate side compartments that include a buoyant compartment above an interior space. In this embodiment, the detachable wall part of the bait net storage compartment advantageously controls access to the bait net storage compartment and to each interior space below a buoyant upper compartment.

The fishing caddy of these preferred embodiments may further include one or more additional storage compartments conveniently accessible via hinged lids. Conveniently, the additional storage compartments may be a cooler compartment and a compartment for storage of tackle and fishing accessories When using an inventive caddy for fishing, allowing entry of water into an interior space below a buoyant compartment results in the caddy floating relatively lower in the water, which benefits flotation balance of the caddy.

After deploying the bait net, the bait net storage compartment is accessed to add live bait the deployed bait net. Before or after the foregoing when the caddy includes a scoop net holder stored within the bait net storage compartment, the scoop net holder is deployed after opening an access lid of the bait net storage compartment. Live bait can be accessed from the deployed bait net using a scoop net, after which the scoop net may be advantageously attached to the deployed scoop net holder.

Without the delay of purchasing a fishing yoyo or fishing rod after arriving at a destination, the fishing experience can begin. The experience can be an underwater snorkeling adventure using a fishing yoyo, or can be a wading adventure using a telescoping or several piece travel fishing rod (either fishing rod having been advantageously stored within one or both of the lower side compartments of a preferred embodiment of the fishing caddy), with appropriate additional fishing gear attached.

Additional advantages and beneficial features of the present invention are set forth in the drawing and detailed description, and in part will become apparent to those skilled in the art upon examination of the drawing and detailed description or may be learned by practice of the invention. As will be realized, this invention is capable of other and different embodiments than those described, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference now is made to the accompanying drawing which forms a part of the specification of the present invention. For clarity, certain features or details have been omitted.

DETAILED DESCRIPTION OF THE INVENTION

Figure 9:
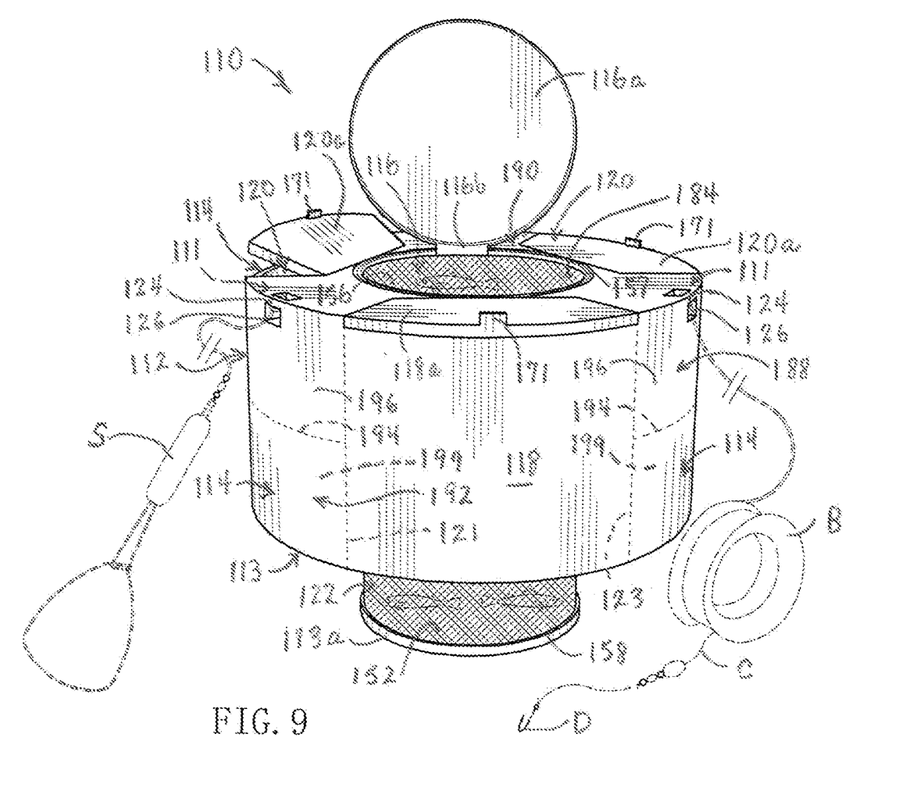
FIG. 9 is a perspective view of another preferred embodiment of a buoyant fishing caddy in accordance with the present invention.

To assist understanding, in the description of the preferred embodiment of FIGS. 1-8, relative terms such as "upper", "lower", "top", "bottom", "above", "below", "beneath", "horizontal", "vertical", "side", "end" and the like, have been used particularly with reference to the orientation of the fishing caddy illustrated in FIG. 2, and in the description of the preferred embodiment of FIG. 9, relative terms such as these, have been used particularly with reference to the orientation of the fishing caddy illustrated in FIG. 9.

Moreover, the terms "length", "height" and "width", as used herein with reference to dimensions of the fishing caddy outer housing, may be understood with reference to the generally rectangularly shaped, outer housing of the preferred embodiment illustrated in FIG. 2 as follows: "length" being an end-to-end distance, "height" being a top-to-bottom distance, and "width" being a side-to-side distance. However, the term "generally rectangularly shaped", as used herein, also includes an outer housing having a generally square cross-section, in other words, a housing in which the "length" and "width" are substantially the same dimension. Otherwise as used herein, the term "length" refers to a relatively longer dimension, and the term "width" refers to the relatively shorter dimension.

A fishing caddy in accordance with the present invention, is beneficially sized to qualify as carry-on luggage for air travel in accordance with current, generally accepted airline standards. As such, although other shapes and sizes could be used, a generally rectangularly shaped, preferred inventive fishing caddy may have dimensions as follows: a length of about 18 inches, a width of about 10 inches, and a height of about 8 inches. However, other dimensions may be used depending on other relevant considerations, it being recognized that the foregoing dimensions are merely illustrative.

If desired, the fishing caddy may be transported and stowed for air travel in a protective fabric bag or the like. Beneficially, its interior structure, described below, and the use of a generally rectangular shape, provide for storage within while traveling, of elongated fishing tackle such as a fishing pole, as well as for storage of other fishing tackle and of fishing tools, and/or for storage of personal items.

The inventive fishing caddy is buoyant and beneficially is constructed as described below, so as, when generally rectangularly shaped, to be balanced side-to-side and end-to-end when partially immersed. It is particularly advantageous for the caddy to provide a stable platform for a deployed bait net and for convenient access to the storage compartments.

Referring to FIGS. 1-4, a preferred embodiment of a fishing caddy 10 in accordance with the present invention, beneficially has a generally rectangularly shaped outer housing 12 having a greater length than width. Fishing caddy 10 may, as illustrated, include three linearly arranged storage compartments 16,18,20 formed in part by, and accessible via, hinged lids 16a,18a,20a. Access to each of these storage compartments is conveniently controlled and secured by a pair of hinged latches 16c,18c,20c. Lids 16a,18a,20a define in part, a top or upper wall 11 of housing 12. The generally rectangular shape of outer housing 12 is provided by an opposing bottom wall 13, opposing side walls 14,15 (best seen in FIGS. 5-7), and opposing end walls 17,19 (best seen in FIGS. 3 and 4), all of which are generally planar.

Figure 3:
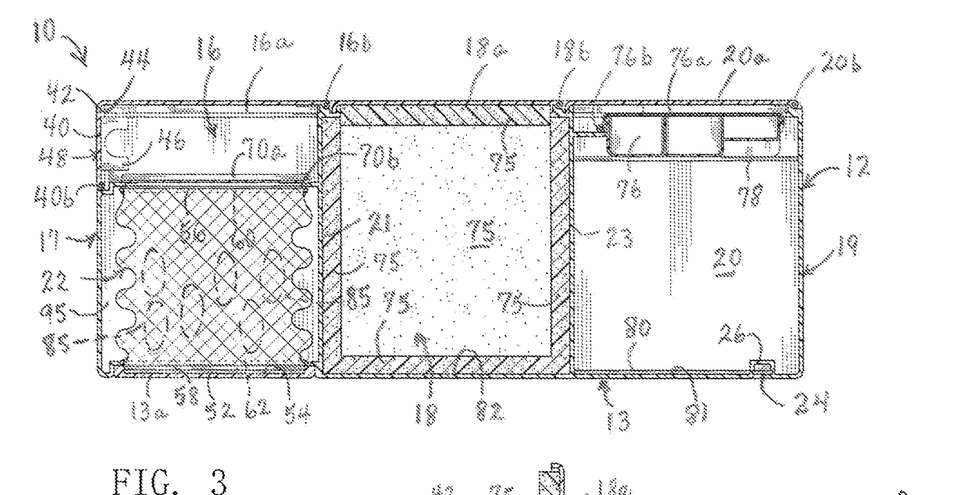
FIG. 3 is a generally cross-sectional view taken substantially along line 3-3 of FIG. 2, that shows a deployable live bait net stowed within the fishing caddy and multiple movable parts in closed position.
Figure 4:
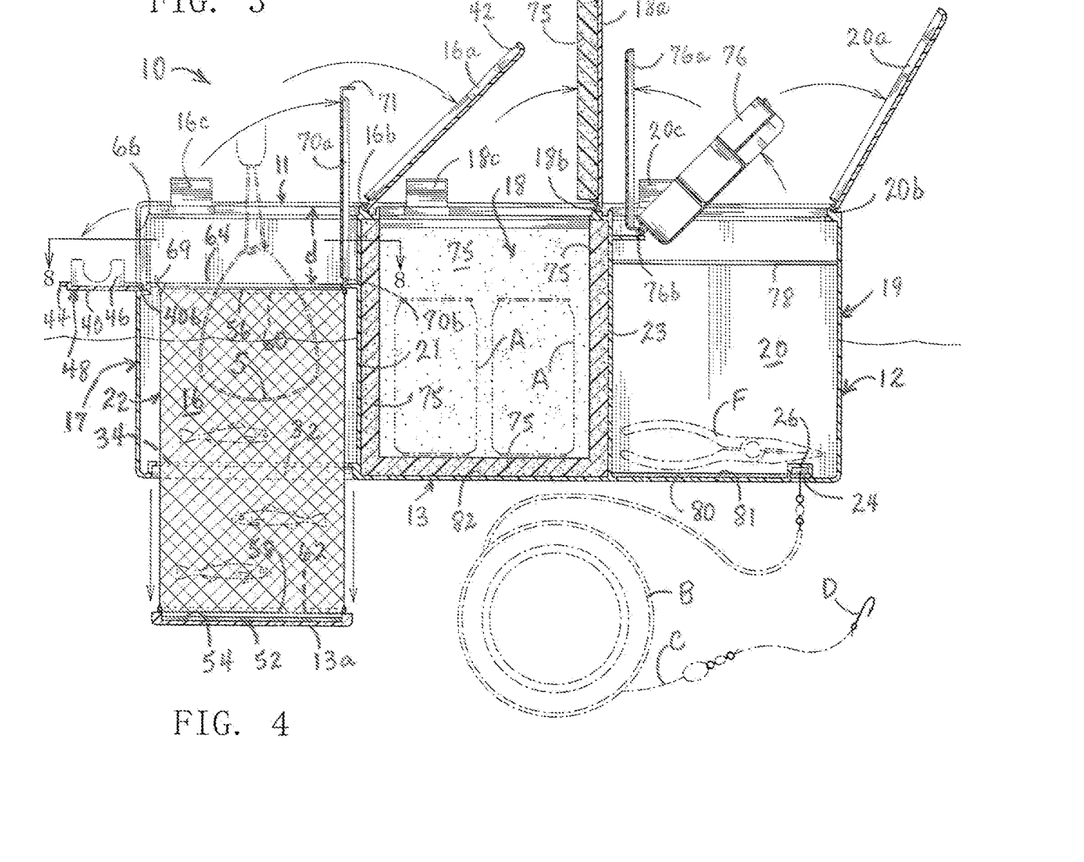
FIG. 4 is a generally cross-sectional view like that of FIG. 3, that shows the live bait net and a scoop net holder in a deployed position, and arrows indicating movement of various parts into an open or deployed position, and that indicates in phantom line, along with other features, a scoop net partially inserted into the live bait net, a fishing yoyo attached to the fishing caddy and from which a fishing line and hook extend.

In FIGS. 3 and 4, storage compartments 16,18,20 are illustrated as follows: compartment 16, for storage of a mesh net 22 for live bait; compartment 18, an insulated compartment, for storage of chilled beverage cans A or the like; and tackle compartment 20, for storage of fishing gear, such as a fishing yoyo B, line C and hook D (indicated in phantom line in FIG. 4 but shown outside compartment 20 and under water) or fishing tools such as pliers F (indicated in phantom line in FIG. 4). Opposing vertical partitions 21,23 within outer housing 12 separate cooler compartment 18 from storage compartments 16,20, the cooler compartment being conveniently between compartments 16,20.

Other useful linear arrangements of storage compartments 16,18,20 exist, and include, without limitation, bait net storage compartment 16 between insulated compartment 18 and tackle box compartment 20. Furthermore, again without limitation, the insulated and tackle box compartments could be in a side-by-side, instead of linear, relationship.

However, of the three storage compartments described, a bait net storage compartment is the only necessary storage compartment of an inventive fishing caddy. Thus, the inventive fishing caddy may include more or less than three storage compartments, and depending on the number and type of storage compartments selected, different storage compartment arrangements may be selected.

With particular reference again to features illustrated in phantom line in FIG. 4, for snorkel fishing, fishing yoyo B may be advantageously attached to the fishing caddy, with fishing line C and hook D extending from the fishing yoyo. Conveniently, the attachment may be to a metal pin 24 accessible via a recess 26 in bottom wall 13 of housing 12.

Figure 1:
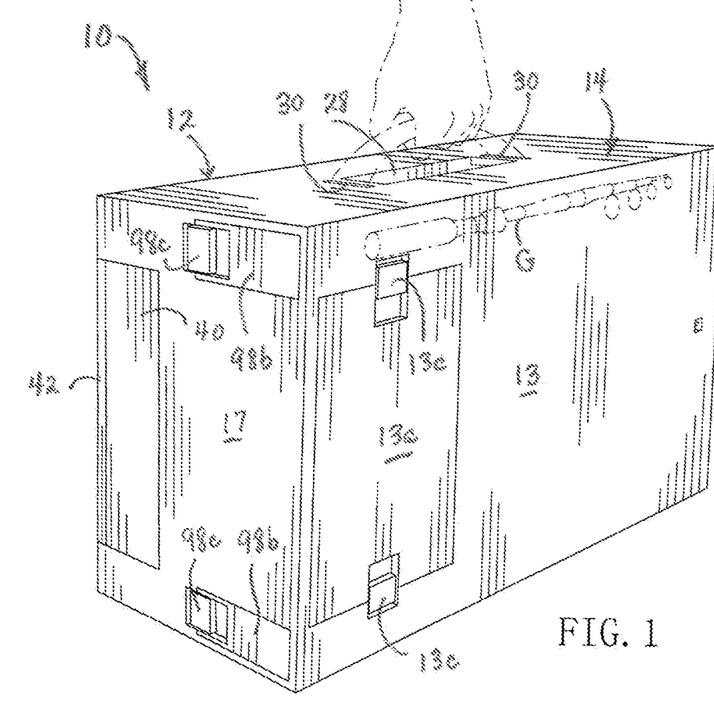
FIG. 1 is a perspective view of a preferred embodiment of a buoyant fishing caddy in accordance with the present invention, oriented for carrying, with a handle and grasping hand, and a fishing pole stowed within a side compartment, indicated in phantom line.
Figure 2:
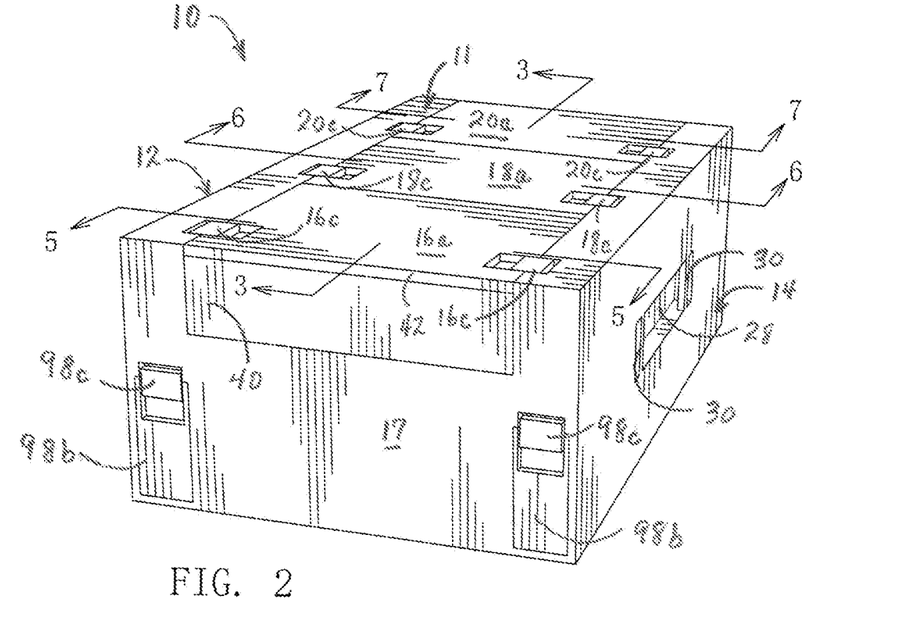
FIG. 2 is a perspective view of the apparatus of FIG. 1, rotated approximately 90 degrees.

Referring in particular to FIG. 2, side wall 14 of outer housing 12 advantageously includes a recess 28 that extends beneath a pair of spaced apart attachment bridges 30 for attaching a handle, shown in phantom line in FIG. 1. Beneficially, the attachment bridges and supporting housing wall structure for the bridges may be strengthened by, for instance, relatively increased wall thickness, to support the weight of the fishing caddy when carried by a handle attached to bridges 30.

Figure 6:
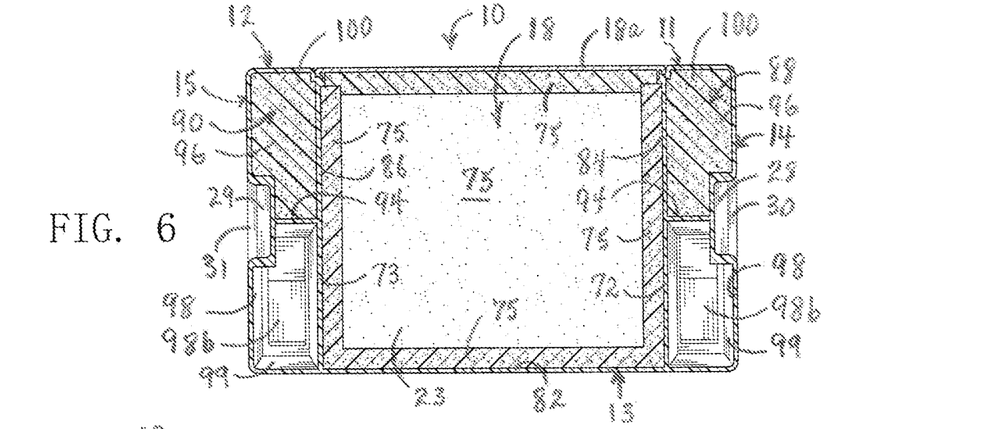
FIG. 6 is a generally cross-sectional view taken substantially along line 6-6 of FIG. 2.

Similarly, with reference to FIG. 6, side wall 15 of outer housing 12 may include a recess 29 that extends beneath a pair of spaced apart attachment bridges 31 (only one shown), for attaching a handle or other useful accessory. Strengthened housing wall structure may advantageously be used.

Referring again to FIG. 1, bottom wall 13 of outer housing 12 advantageously includes a generally planar, detachable wall part 13a, detachment of which is conveniently controlled by hinged latches 13c, and which is beneficially attached to the bait net. With reference to FIGS. 3 and 4, detachable wall part 13a is the lower wall of bait net storage compartment 16, and as such, is beneath the bait net and is appropriately dimensioned in length and width to enclose a lower opening 32 (indicated in FIG. 4) in bait net storage compartment 16 and to form part of the generally planar bottom wall of the housing prior to being detached. In accordance with the invention, when wall part 13a is detached, mesh net 22 is deployable through opening 32 as illustrated in FIG. 4, and the detachable wall part additionally functions as a structural member that benefits configurational stability of the deployed bait net.

With continued reference in particular to FIG. 4, bottom housing wall 13 beneficially includes a recessed ledge 34 for receiving the detachable lower wall of the bait net storage compartment. Ledge 34 conveniently surrounds opening 32 in bottom wall 13 of the housing. Beneficially, bait net 22 is stowed and secured within storage compartment 16 when wall part 13a is seated against recessed ledge 34, and hinged latches 13c, shown in FIG. 1, are engaged.

With continued reference to FIGS. 3 and 4, end wall 17 of the outer housing, and more particularly of bait net storage compartment 16, may beneficially include a hinged wall part 40, deployment of which is advantageously controlled by an end 42 of lid 16a that overlaps a projecting upper end 44 of hinged wall part 40. As illustrated in FIGS. 3 and 4, the projecting upper end is an interiorly stepped projection. With particular reference to FIG. 4, hinged wall part 40 when released by opening lid 16a, is outwardly rotatable (approximately 90 degrees) about a hinge 40b. A pair of spaced apart clips 46 (best seen in FIG. 8) project generally upwards from deployed hinged wall part 40, for holding a scoop net S (shown in phantom line in FIGS. 4 & 8) in place when the scoop net is not in use, and thereby may provide a scoop net holder 48. Prior to being deployed, scoop net holder 48 is kept within the bait net storage compartment by overlapping end 42 of lid 16a.

With continued reference to FIGS. 3 and 4, but returning to a description of features related to the deployable bait net, a metal plate 52 or the like may be disposed on, and affixed to, an interior surface 54 of detachable wall part 13a to add weight for assisting and maintaining extension of the deployed bait net. Conveniently, weight 52 may be generally coextensive with interior surface 54 of detachable wall part 13a.

As indicated in FIGS. 3 and 4, the bait net includes an open top 56 and a bottom 58 (optionally a closed bottom) each of which may be conveniently attached to, and in the case of the bait net top, supported by, a supporting rod configured to fit within the interior dimensions of the bait net storage compartment, with a generally rectangular configuration being useful for upper and lower rods 60,62. The bait net may be attached to rods 60,62 in any suitable way.

If desired, the bait net top may be attached to interior walls of the bait net storage compartment, and the bait net bottom may be attached to detachable wall part 13a, without use of the rods. Any suitable way may be used for these attachments.

When rods 60,62 are used, upper rod 60 may be conveniently supported by, and held in place by, clips (not shown) that project from a generally rectangular interior ledge 64 (indicated in FIG. 4) of the bait net storage compartment. Similarly, lower rod 62 and detachable wall part 13a may likewise be conveniently attached to one another by clips (not shown) that project from detachable wall part 13a.

As illustrated in FIG. 4, supporting ledge 64 for the bait net top may be advantageously spaced below upper wall 11 of housing 12, a distance "d", indicated in FIG. 4, to provide for a relatively greater length of the bait net to be submerged. Distance "d" depends on factors including, without limitation, the overall dimensions of the fishing caddy, the length of a deployed bait net, and whether or not, end wall 17 includes hinged wall part 40 and hence has an opening 66 upon deployment of scoop net holder 48. However, for sake of illustration in the case of a height of about 8" of the outer housing of fishing caddy 10 and hence of the bait net compartment, a suitable distance "d" can be in the range of about 2" to 3". As used herein with reference to the length of a bait net, the term "length" means a top-to-bottom distance of a deployed bait net.

Referring to FIGS. 3-5 and 8, to minimize escape of live bait from, and to further control access to, the open top of the bait net, the bait net storage compartment beneficially may include a pair of interiorly-disposed hinged lids 70a (best seen in FIG. 8), movable about a hinge 70b. Each of lids 70a is conveniently provided with an opening 68 through which an upwardly projecting catch 69 (see FIGS. 4 & 8) extends, and in addition with a pull 71 (best seen in FIG. 4) to open the lids. Lids 70a are shown in a closed position in FIG. 3, and are shown in an open position in FIG. 4, and are advantageously disposed immediately above the open top of the bait net.

When, as illustrated, the inventive device includes scoop net holder 48, it is advantageous for opening 66 in end wall 17, and interiorly-disposed hinged lids 70a, and the open top of the bait net to be above the waterline, and for lids 70a and the open top of the bait net to be below opening 66. In this regard, reference is made to the earlier description of a distance "d" in its relation to supporting ledge 64.

With continued reference to FIGS. 3 and 4, access lids 16a,18a,20a, which are conveniently movable about hinges 16b,18b,20b, are shown in a closed position in FIG. 3 and in an open position in FIG. 4. Other types of closure such as friction fit closure, instead of latches, may be used where appropriate; however, latches provide a secure closure.

As indicated and with reference to cooler compartment 18, the interior surfaces of access lid 18a, of opposing vertical partitions 21,23, of opposing vertical side walls 72,73 (shown in FIG. 6) and of a lower surface 82 of the cooler compartment are advantageously lined with an insulating material 75.

With reference to tackle compartment 20, a tackle tray 76 illustrated within the tackle compartment in FIG. 3, beneficially includes an access lid 76a, with conveniently both tackle tray 76 and hinged lid 76a movable about hinge 76b. Tackle tray 76 advantageously may include multiple compartments for storage of fishing tackle. Hinged lid 76a and tackle tray 76 are illustrated in a closed position in FIG. 3 and in a raised position in FIG. 4.

A ledge 78 within the tackle compartment supports the tackle tray when in the closed position. For access to contents within the tackle compartment below the tackle tray, tackle tray 76 is advantageously movable about hinge 76b into a raised position, in which case lid 76a of the tackle tray is closed to prevent contents of the otherwise open tackle tray from spilling out.

Beneficially, for end-to-end, that is, longitudinal, stability of the buoyant caddy of FIGS. 1-8, tackle compartment 20 may include a metal plate 80 or the like, on, and conveniently affixed to, an inside lower surface 81 of the tackle compartment. Weight 80 may be generally coextensive with inside lower surface 81.

Use of a metal plate and the thickness illustrated in the drawing for a metal plate are not intended to be limiting in any way; rather, a skilled artisan is capable of selecting an appropriately counterbalancing weight. Furthermore, if desired or appropriate to provide additional flotation stability, a metal plate (not shown) or the like may be positioned between insulating material 75 and lower surface 82 of the cooler compartment.

Figure 5:
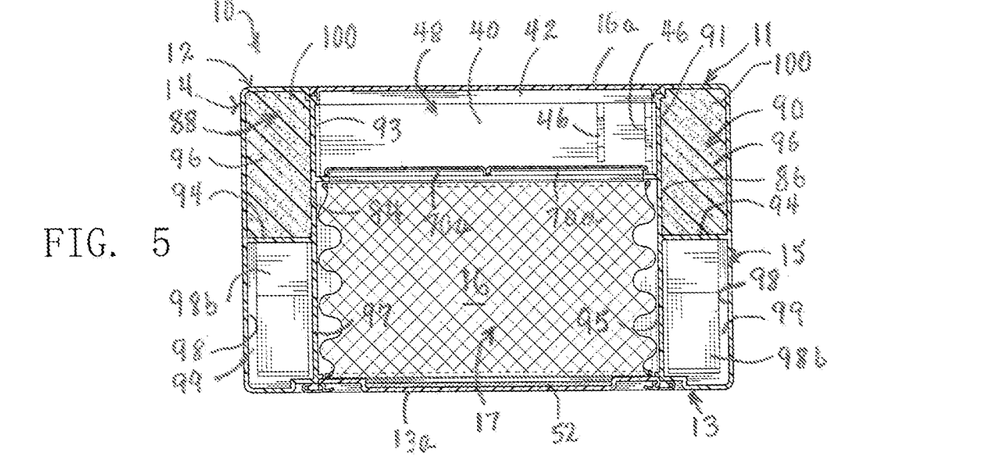
FIG. 5 is a generally cross-sectional view taken substantially along line 5-5 of FIG. 2.
Figure 7:
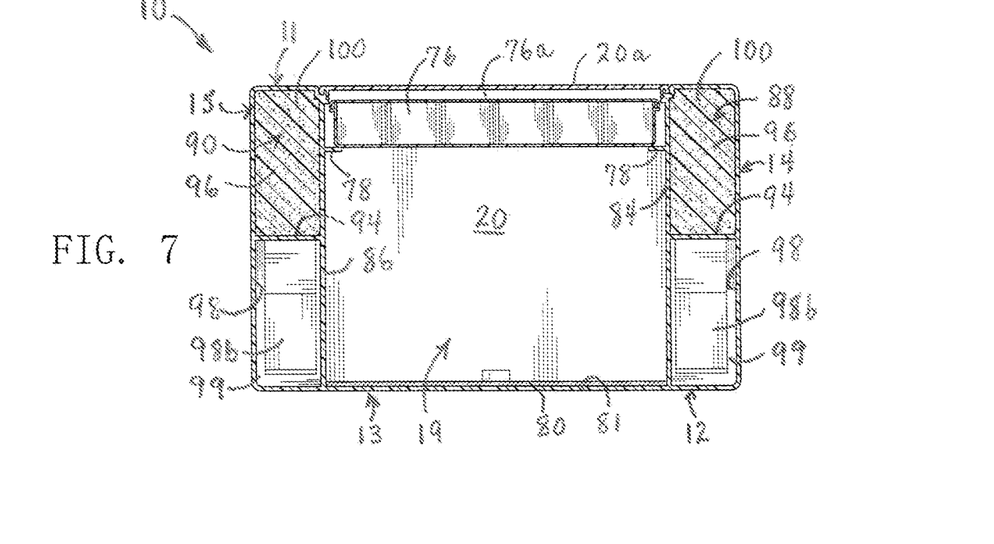
FIG. 7 is a generally cross-sectional view taken substantially along line 7-7 of FIG. 2.
Figure 8:
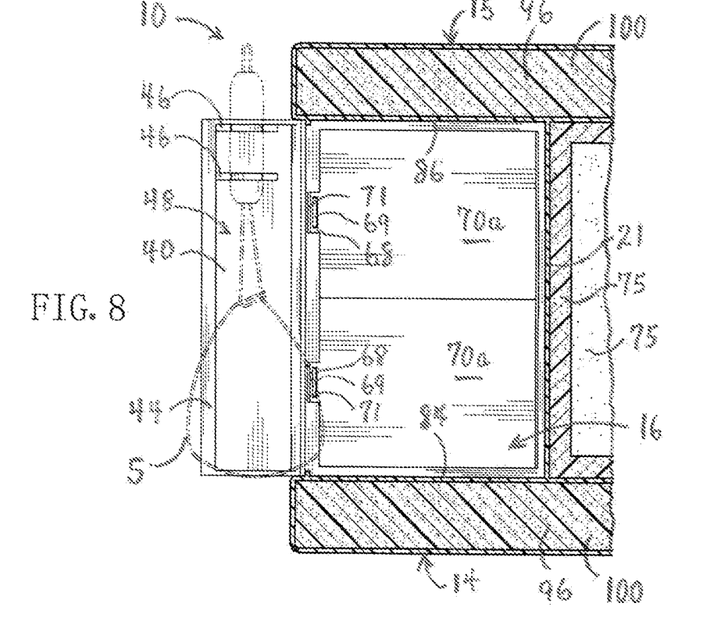
FIG. 8 is a partial, generally cross-sectional view taken substantially along line 8-8 of FIG. 4, showing the deployed scoop net holder holding a scoop net indicated in phantom line, but varying from FIG. 4 by showing a pair of hinged lids in a closed position above the live bait net.

With reference to FIGS. 5 to 7, the caddy beneficially includes within outer housing 12 opposing vertical partitions 84,86, which are spaced apart from opposing housing side walls 14,15 to form side compartments 88,90 of the caddy.

Vertical partitions 84,86 are coextensive in length and height with housing side walls 14,15, and are conveniently the side walls of storage compartment 16, side walls 72,73 of the cooler compartment, and the side walls of the tackle compartment.

Side compartments 88,90 are beneficially each divided by a generally horizontal partition 94 into a generally horizontal, upper side compartment 96 and a generally horizontal, lower side compartment 98. Referring to FIG. 5 in particular, adjacent the bait net storage compartment, vertical partitions 84,86 define interior side walls 91,93 of upper side compartments 96, and interior side walls 95,97 of lower side compartments 98.

Upper side compartments 96 and lower side compartments 98 advantageously run the length of the outer housing. Each of upper side compartments 96 provides buoyancy and is advantageously sealed. To this end, outer housing 12 and the partitions within are benefited by being made of a material impermeable to, for instance, air. Although air may be contained within the upper compartments to provide buoyancy, a buoyant material 100 provides benefit if an upper compartment seal is compromised.

Each of side walls 95,97 of the bait net storage compartment is advantageously provided with apertures 85 (shown in FIG. 3 for side wall 95; omitted for clarity from FIG. 4). Apertures 85 provide fluid communication between the bait net storage compartment and an interior space 99 (indicated in FIGS. 5-7) within each of lower side compartments 98. Each interior space 99 has an upper boundary defined by horizontal partition 94 and a lower boundary defined by bottom wall 13. After detaching wall part 13a of the bait net storage compartment from the bottom wall, water enters the bait net storage compartment and in addition enters lower side compartments 98 though apertures 85. Accordingly, the detachable wall part advantageously functions to control the entry of water into the bait net storage compartment and also into the lower compartments. Side-to-side balance of the caddy is benefited.

Interior spaces 99 of lower side compartments 98 are advantageously accessible for storage conveniently via hinged closure members 98b located conveniently at each end of each of lower compartments 98. Latches 98c (shown in FIGS. 1 and 2) conveniently control opening and closure of hinged closure members 98b. Removable end caps for the lower compartments may be used instead of the hinged closure members, if desired.

The upper and lower compartments may be of about equal height with separation provided by longitudinal partition 94. As a result, the scoop net holder, opening 66 in end wall 17, lids 70a, and the open top of the bait net are all in a position to be above the waterline.

In a variation of the wall structure of the bait net storage compartment of fishing caddy 10, apertures 85 may be omitted from interior side walls 95,97. In this variation, entry of water into lower side compartments 98 is conveniently provided by hinged closure members 98b. After detaching wall part 13a of the bait net storage compartment from the bottom wall, water only enters the bait net storage compartment. Accordingly, the detachable wall part of this variation functions as a closure member to control the entry of water only into the bait net storage compartment. After the entry of water into the lower side compartments, closing the lower side compartments may benefit additional stability, including side-to-side balance, depending upon water conditions such as currents and debris in the water.

In a further variation of the wall structure of the bait net storage compartment of fishing caddy 10, vertical partitions 84,86 advantageously extend downward from top wall 11 toward bottom wall 13 only so far as to join horizontal partition 94. In this variation, no interior side walls 95,97 separate the lower compartments from the bait net storage compartment. Fluid communication between the bait net storage compartment and each lower compartment occurs via an interior space having an upper boundary defined by the horizontal partition and a lower boundary defined by the bottom wall. Accordingly, as previously described, after detaching wall part 13a of the bait net storage compartment from the bottom wall, water advantageously enters the lower compartments as well as the bait net storage compartment. In this variation of fishing caddy 10, the detachable wall part once again functions to control the entry of water into the bait net storage compartment and also into the lower compartments.

As previously mentioned, other shapes of a fishing caddy in accordance with the present invention, are useful. Referring to FIG. 9, illustrative is a preferred embodiment of a fishing caddy that has a generally circular shape. For sake of brevity, like parts of fishing caddy 110 have been designated with like numbers, and the description of fishing caddy 110 is abbreviated, it being intended that reference can be made to the foregoing description of fishing caddy 10 for parts designated with like numbers.

Fishing caddy 110 includes a generally centrally located, bait net storage compartment 116, which is generally cylindrical, and, as previously described, a wall part 113a detachable from an outer housing 112 (wall part 113a is illustrated in a deployed configuration). Also as previously described, a bottom 158 of the bait net is advantageously attached to the detachable wall part, and the detachable wall part benefits configurational stability of a deployed bait net. Unlike fishing caddy 10, an open top 156 of the bait net is conveniently near a recessed ledge 157 of the bait net storage compartment that supports lid 116a when the lid is closed.

Exterior to the bait net storage compartment, a generally circular, outer housing wall 114 is spaced apart from, and cooperates with, a generally circular peripheral wall 184 of the bait net storage compartment to form an encircling ring that includes generally arcuate side compartments. As illustrated, the generally arcuate side compartments of fishing caddy 110 include an insulated storage compartment 118 and optionally two tackle storage compartments 120. An upper wall 111 of outer housing 112 includes hinged lids 116a, 118a, 120a of storage compartments 116, 118, 120, and each lid is conveniently provided with a pull tab 171.

In addition, fishing caddy 110 includes generally arcuate side compartments 188,190,192, each of which includes, as previously described, an upper compartment 196 that provides buoyancy and is advantageously sealed. As previously indicated, a generally horizontal partition wall 194 forms the lower boundary of each of buoyant compartments 196.

As illustrated, generally arcuate storage compartments 118,120 and generally arcuate side compartments 188,190,192 are arranged such that each of side compartments 188,190,192 is between two of the storage compartments, and side compartments 188,190,192 are equidistantly spaced apart to promote flotation balance. Vertical partitions 121,123 separate side compartments 188,190,192 from storage compartments 118,120, and according are substantially coextensive in height with outer housing wall 114 and peripheral wall 184, and thus define the side walls of the generally arcuate side compartments.

Similar to a previously described variation of fishing caddy 10, peripheral wall 184 of the bait net storage compartment advantageously extends downward from upper wall 111 toward a bottom wall 113 of each of compartments 188,190,192 only so far as to join the lower boundary (horizontal partition wall 194) of each of upper compartments 196. Thus, each of upper compartments 196 is above an interior space 199 in fluid communication with the bait net storage compartment and open to the entry of water as described below. The upper and lower boundaries of each of interior spaces 199 are defined by horizontal partition wall 194 and bottom wall 113, respectively.

After detaching generally circular wall part 113a from generally circular bottom wall 113, water enters the bait net storage compartment and also interior spaces 199, which are below buoyant compartments 196, thereby providing for caddy 110 to float relatively lower in the water, which benefits flotation balance. As previously described, a metal plate 152 or the like may be disposed on, and affixed to, an interior surface of detachable wall part 113a.

By contrast, peripheral wall 184 of the bait net storage compartment beneficially extends downward to join bottom wall 113 of each of generally arcuate storage compartments 118,120. As previously described, metal plates or the like (not shown) may be disposed on, and affixed to, an interior bottom surface of storage compartments 118,120, for flotation balance as desired or needed.

As similarly described for fishing caddy 10, bait net 122 is stowed and secured within storage compartment 116 when generally circular, detachable wall part 113a is seated against a recessed ledge (not shown) that conveniently surrounds a generally circular lower opening (not shown) in the bait net storage compartment, and latches (not shown) for securing the detachable wall part to generally circular bottom wall 113 are engaged. When attached, detachable wall part 113a encloses the generally circular lower opening in the bait net storage compartment, and forms part of generally circular bottom wall 113 of outer housing 112. Similar to the fishing caddy 10, the detachable wall part of fishing caddy 110 serves as a closure member not only for the bait net storage compartment but also for interior spaces 199 below buoyant compartments 196.

In a variation of fishing caddy 110, the storage compartments may be exterior to an encircling ring likewise defined in part by a generally circular, outer housing wall spaced apart from, and cooperating with, a generally circular peripheral wall of a generally cylindrical bait net storage compartment, but that consists of a generally circular side compartment that includes, as described, a generally horizontal partition wall that separates a buoyant upper compartment from an interior space having a lower boundary defined by a generally circular bottom wall of the outer housing. One or more generally arcuate side compartments may be within the encircling ring. The generally circular, outer housing wall conveniently provides a wall of each such exterior storage compartment.

Various conventional materials may be used for the caddy housing and stowable bait net, and as the buoyant material, with suitable materials being selected for economy. That said, the outer housing and the partitions within may be conveniently made of a plastic material, for instance, molded of a light weight, rugged plastic. Likewise, the stowable bait net may be made of nylon, fabric, monofilament or light weight metal. Similarly, the buoyant material may be a closed cell foam or other suitable material for providing buoyancy.

When carrying or transporting an inventive fishing caddy, the detachable wall part of the bait net storage compartment is attached to the outer housing, and a deployable bait net is stowed and secured within the bait net storage compartment. To fish, the detachable wall part of the bait net storage compartment is detached from the outer housing, and the bait net is deployed and the detachable wall part additionally functions as a structural member that benefits configurational stability of the deployed bait net.

After placing the inventive fishing caddy in water, allowing entry of water into an interior space below a buoyant upper compartment results in the caddy floating lower in the water, which benefits flotation balance. As previously described, detaching the detachable wall part may advantageously allow entry of water into the bait net storage compartment and into an interior space in fluid communication with the bait net storage compartment.

With continued reference to preferred embodiment 10, after deploying the bait net, lid 16a and interiorly-disposed lids 70a of the bait net storage compartment may be opened and live bait added to the deployed bait net. Before or after the foregoing, when the inventive fishing caddy includes a scoop net holder stored within the bait net storage compartment, access lid 16a of the bait net storage compartment is opened to release the scoop net holder for subsequent deployment. Live bait can be accessed from the deployed bait net using a scoop net, after lifting one or both of interiorly disposed lids 70a. When not in use, the scoop net, which conveniently floats, can be advantageously attached to the deployed scoop net holder.

When lower side compartments 98, or as illustrated in FIG. 1 a lower side compartment 98, is used to store and carry a telescoping fishing rod G (indicated in phantom line) or a multipiece fishing rod, or other fishing or personal gear, removal of the rod or gear from the lower side compartment or compartments typically precedes placing the fishing caddy in water. The fishing experience can be underwater or standing in water, or as otherwise desired.

Various modifications and combinations have been described; and other modifications will be readily apparent to one skilled in the art. For example, other latch constructions or latch locations could be used in place of, or in addition to, the hinged latches and locations illustrated. Accordingly, the present invention may be carried out with other modifications and/or combinations without departing from the spirit or essential attributes thereof, and reference should be made to the appended claims as indicating the scope of the invention.

The invention claimed is:

1. A buoyant fishing caddy comprising an outer housing comprising a wall part detachable from the housing, and within the housing, a bait net storage compartment, wherein a bottom of a bait net is attached to the detachable wall part,
wherein in a first configuration, said bait net is stowed within said bait net storage compartment, and the detachable wall part of said outer housing is closure means for an opening in a bottom wall of said outer housing, and is attached to said outer housing, and
wherein in a second configuration, the detachable wall part of said outer housing is detached from said outer housing and said bait net is in a deployed position,
further comprising within said outer housing and exterior to said bait net storage compartment, side compartments that provide buoyancy, wherein each of said side compartments that provide buoyancy is above a lower interior space of said housing, each of said lower interior spaces being in fluid communication with said bait net storage compartment.

2. A buoyant fishing caddy comprising an outer housing comprising a wall part detachable from the housing, and within the housing, a bait net storage compartment, wherein a bottom of a bait net is attached to the detachable wall part,
wherein in a first configuration, said bait net is stowed within said bait net storage compartment, and the detachable wall part of said outer housing is closure means for an opening in a bottom wall of said outer housing, and is attached to said outer housing, and
wherein in a second configuration, the detachable wall part of said outer housing is detached from said outer housing and said bait net is in a deployed position,
wherein an end wall of said outer housing comprises a hinged wall part, wherein in a closed position of said hinged wall part, a holder for a scoop net is disposed within said bait net storage compartment, and wherein in an open position of said hinged wall part, the scoop net holder is in a deployed position for holding the scoop net, wherein the scoop net holder comprises means for holding the scoop net.

3. The fishing caddy of claim 2, wherein said bait net storage compartment further comprises an access lid having an end that in said closed position of said hinged wall part, overlaps a projecting upper end of said hinged wall part, for preventing deployment of the scoop net holder, and wherein said hinged wall part is released for deployment into said open position by opening said access lid.

4. A buoyant fishing caddy comprising an outer housing comprising a wall part detachable from the housing, and within the housing, a bait net storage compartment, wherein a bottom of a bait net is attached to the detachable wall part,
wherein in a first configuration, said bait net is stowed within said bait net storage compartment, and the detachable wall part of said outer housing is in a closed position for closing an opening in a bottom wall of said outer housing, and is attached to said outer housing, and
wherein in a second configuration, the detachable wall part of said outer housing is detached from said outer housing and said bait net is in a deployed position,
further comprising within said outer housing and exterior to said bait net storage compartment, at least one compartment that provides buoyancy, wherein the at least one compartment that provides buoyancy is above a respective interior space of said housing, and
a generally horizontal partition that serves as a lower boundary of the at least one compartment that provides buoyancy and as an upper boundary of said interior space,
wherein said interior space is in fluid communication with said bait net storage compartment.

5. The buoyant fishing caddy of claim 4, wherein in said first configuration, the detachable wall part of said outer housing is seated against a recessed surface surrounding said opening in said bottom wall.

6. The fishing caddy of claim 4, wherein said outer housing is generally rectangularly shaped, and further comprises opposing end walls and opposing side walls, wherein each side wall of said outer housing is spaced apart from a respective vertical partition generally parallel thereto, wherein the opposing side walls and the vertical partitions cooperate to define interior side compartments of the caddy that comprise said at least one compartment that provides buoyancy and said interior space.

7. The fishing caddy of claim 4, wherein said bait net storage compartment is generally cylindrical, and said outer housing comprises a generally circular wall that is spaced apart from, and cooperates with, a generally circular peripheral wall of said bait net storage compartment to form a ring that encircles the bait net storage compartment, wherein the at least one compartment that provides buoyancy and the interior space are generally arcuate in shape.

8. The fishing caddy of claim 4, further comprising additional storage compartments, wherein said additional storage compartments comprise a cooler compartment and a compartment for storage of tackle and fishing accessories, wherein opposing vertical partitions separate the bait net storage compartment, cooler compartment, and the compartment for storage of tackle and fishing accessories.

9. A method comprising providing the fishing caddy of claim 1, placing the fishing caddy in water, detaching said detachable wall part of said outer housing from said outer housing to deploy the bait net and allow entry of water into said bait net storage compartment and into the lower interior spaces.

10. A method comprising providing of use of the fishing caddy of claim 2, placing the fishing caddy in water, detaching said detachable wall part of said outer housing from said outer housing to deploy the bait net, and releasing for deployment the scoop net holder, by opening an access lid of said bait net storage compartment.

11. A method comprising providing the fishing caddy of claim 6, placing the fishing caddy in water, detaching said detachable wall part of said outer housing from said outer housing to deploy the bait net and allow entry of water into said bait net storage compartment and into the interior space.

12. A method comprising providing of use of the fishing caddy of claim 7, placing the fishing caddy in water, and detaching said detachable wall part of said outer housing from said outer housing to deploy the bait net and to allow entry of water into said bait net storage compartment and into said interior space.

* * * * *